July 8, 1941.  R. T. GILLETTE  2,248,621
METHOD OF FABRICATING WELDED ASSEMBLIES
Filed Dec. 13, 1938
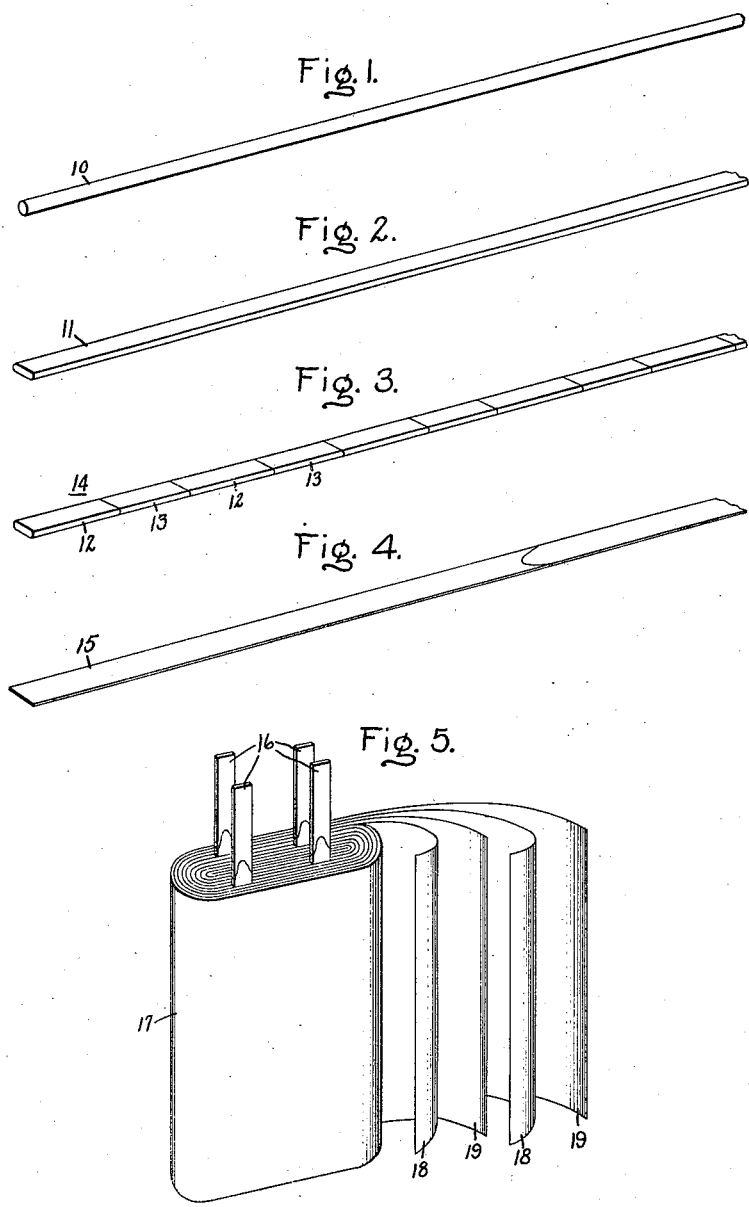
Inventor:
Robert T. Gillette,
by Harry E. Dunham
His Attorney.

Patented July 8, 1941

2,248,621

UNITED STATES PATENT OFFICE 2,248,621

METHOD OF FABRICATING WELDED ASSEMBLIES

Robert T. Gillette, Scotia, N. Y., assignor to General Electric Company, a corporation of New York Application December 13, 1938, Serial No. 245,432

4 Claims. (Cl. 29—188)

My invention relates to a method of fabricating welded assemblies.

In the manufacture of certain welded articles the size of the parts to be welded together are frequently so small that the desired welding operation cannot be performed.

It is an object of my invention to make such articles out of larger parts by partially reducing the size of said larger parts, then welding them together and finally reducing the welded assembly into the finished article.

By adopting this procedure, the welds which are usually less ductile than the parts which they connect are worked much less in reducing parts of suitable size to form parts of the desired size in the finished article.

My invention will be described as applied to the manufacture of ribbon-like connectors of substantially uniform width and thickness having sections of copper and aluminum joined together by a weld.

As illustrated in the drawing, round wires of copper and aluminum such as illustrated in Fig. 1 are partially flattened by lengthwise rolling as illustrated in Fig. 2, then cut into sections which are welded together to form a composite rod having alternate sections of copper and aluminum such as illustrated in Fig. 3, and this composite rod is further flattened by lengthwise rolling into a ribbon such as illustrated in Fig. 4. Each metallic section of this ribbon is then cut intermediate its ends to divide it into connectors which may be used as terminal conductors in an electrical condenser such as illustrated in Fig. 5.

In the manufacture of electrical condensers formed of thin sheets of aluminum foil spaced from one another by thin sheets of paper, terminal connections are provided by inserting next to the sheets of aluminum foil thin ribbon-like conductors of aluminum. It is very difficult to make a corrosion-resisting connection between these aluminum strips. Terminal conductors of copper which may be satisfactorily connected with one another and with a suitable condenser terminal cannot be associated with the aluminum foil of the condenser as a terminal connection. It is possible, however, to use a terminal connection having a portion formed of aluminum which is in contact with the aluminum foil of the condenser and another portion of copper which can be used in making a corrosion-resisting connection. My invention is of particular utility in fabricating such connectors.

Since these terminal connectors are inserted between the sheets of aluminum foil and paper of which the condenser is formed, they must be free of all burrs and rough edges which might damage the aluminum foil or paper. By lengthwise rolling a round wire, it is possible to produce ribbon-like strips having smooth edge portions. The width and thickness of the strip will depend on the initial size of the wire from which it is formed and consequently, to obtain a strip of the desired width and thickness, it is necessary to use a wire that is much larger than the minimum size that can be conveniently resistance butt welded.

It is very difficult to obtain a ductile weld between copper and aluminum because of the formation during welding of a brittle copper-aluminum alloy. If, during welding, all but a very thin layer of this copper-aluminum alloy is forced from the joint, it is possible to obtain a weld which is sufficiently ductile to withstand a certain amount of mechanical working. The larger the sections of aluminum and copper welded to one another, the more difficult it is to completely eliminate from the joint all of this brittle copper-aluminum alloy. Consequently, in accordance with my invention, the round wires of copper and aluminum are partially reduced to their ultimate size before welding them together in order to facilitate the formation of a good weld. This procedure also makes it unnecessary to work the weld to the same extent that the wire is worked in reducing it to the size of the connector.

In accordance with my invention, ribbon-like connectors are manufactured as follows: Wires of copper and aluminum, 10 of Fig. 1, reducible by lengthwise rolling to the desired width and thickness of the connector strip are partially flattened as shown at 11 in Fig. 2, to a thickness which will not reduce their stiffness below that required for an end-to-end resistance butt welding operation but which is more than the thickness of the connector. These flattened wires are then cut into sections reducible by further lengthwise rolling to the width and thickness and twice the length of the corresponding metallic sections of the connectors. These partially flattened sections of copper and aluminum wire 12 and 13 of Fig. 3 are then resistance butt welded to form a substantial length of partially flattened composite wire 14 in which the metals are alternately arranged. The resistance butt welding procedure employed may be that described and claimed in my United States Letters Patent 2,114,837, granted April 19, 1938. Under certain conditions, it may be possible to make the welded union by percussive welding. During the formation of each weld, a part of each metallic section is forced out of the weld forming an enlargement or "flash" which contains the brittle alloys of copper and aluminum above referred to. Each weld is then sized by removing this flash by cutting or grinding or otherwise sizing the weld to the contour of the flattened sections. The composite wire thus finished is then further rolled in a lengthwise direction to flatten the welds and further flatten the partially flattened wire sections into a ribbon 15 having the desired width and thickness of the connectors. It will be noted that each metal is independently rolled by lengthwise rolling the composite wire and this eliminates any rolling difficulties due to the different deforming characteristics of each metal. Each section of this ribbon is then cut intermediate its ends to divide the ribbon into the connectors. The burr resulting at the ends of the connectors as a result of this cutting operation are then removed and since the edges of the connector are formed with a smooth edge, the connector as a whole is free of burrs or rough edges.

Under certain conditions it may prove desirable to anneal the wires or the welded assembly between rolling operations and it is to be understood that such annealing operations may form a part of the above described procedure.

The finished connectors may be employed as terminal conductors in a condenser in the manner illustrated in Fig. 5. The condenser 17 there illustrated is formed of sheets of aluminum foil 18 separated by sheets of paper 19 and the connectors 16 are inserted in the condenser so that their aluminum portions engage the aluminum sheets of the condenser. The copper portions of these connectors may be suitably connected with one another or suitable terminals forming part of the condenser assembly (not shown).

It is apparent that my invention is not limited to the formation of copper-aluminum connector strips for condensers since the principles involved are equally applicable in the fabrication of other welded assemblies made of copper and aluminum or of other dissimilar metals. It is to be understood that references above and in the claims to round wire does not mean that the wire must be cylindrical since any rounded contour will be satisfactory for obtaining the smooth edges desired.

What I claim as new and desire to secure by Letters Patent of the United States is:

1. The method of fabricating a metallic ribbon having lengthwise sections of different metals welded together at their adjacent ends, which comprises lengthwise rolling round wires of different metals having substantially the same cross section to flatten them equally to a thickness more than the thickness of said ribbon, welding sections of said partially flattened wires end to end with their flattened portions in substantially the same planes to form a welded assembly having lengthwise sections of different metals, sizing the weld between flattened wire sections in said welded assembly to the same cross sectional contour as said flattened wire sections, and flattening said weld and further flattening said partially flattened wire sections in said welded assembly by lengthwise rolling said welded assembly to the thickness of said ribbon.

2. The method of fabricating a ribbon-like connector having lengthwise sections of copper and aluminum welded together at their adjacent ends, which comprises lengthwise rolling round wires of copper and aluminum having substantially the same cross section to flatten them equally to a thickness which will not reduce their stiffness below that required for an end-to-end resistance butt welding operation but which is more than the thickness of said ribbon-like connector, cutting said partially flattened wires of copper and aluminum into sections reducible by further lengthwise rolling to the width and thickness and twice the length of the corresponding metallic sections of said ribbon-like connectors, resistance butt welding said sections of partially flattened copper and aluminum wires end to end with their flattened portions in substantially the same planes to form a welded assembly having lengthwise sections of copper and aluminum joined to one another by a very thin layer of copper-aluminum alloy formed during the welding operation, sizing the welds between flattened wire sections in said welded assembly to the same cross sectional contour as said flattened wire sections, flattening said welds and further flattening said partially flattened wire sections in said composite wire by lengthwise rolling said composite wire into a ribbon having the thickness of said ribbon-like connectors, and cutting each copper and aluminum section of said ribbon intermediate its ends to divide said ribbon into said ribbon-like connectors.

3. The method of fabricating a metallic ribbon having lengthwise sections of copper and aluminum welded together at their adjacent ends, which comprises lengthwise rolling round wires of copper and aluminum having substantially the same cross section to flatten them equally to a thickness which will not reduce their stiffness below that required for an end to end resistance butt welding operation but which is more than the thickness of said ribbon, resistance butt welding sections of said partially flattened copper and aluminum wires end to end with their flattened portions in substantially the same planes to form a welded assembly having lengthwise sections of copper and aluminum joined to one another by a very thin layer of copper-aluminum alloy formed during the welding operation, sizing the weld between copper and aluminum sections of said welded assembly to the same cross sectional contour as the flattened wire sections of which said welded assembly is formed, and flattening said weld and further flattening said partially flattened wire sections in said welded assembly by lengthwise rolling said welded assembly to the thickness of said ribbon.

4. The method of fabricating an article of parts forming a welded union of less ductility than that of said parts which comprises lengthwise rolling parts having substantially the same cross section to flatten them substantially the same amount to a thickness more than the thickness of said article but within the ductility working range of a weld between said flattened parts when said weld is flattened to the thickness of said article, welding sections of said partially flattened parts end to end with their flattened portions in substantially the same planes to form a welded assembly, and lengthwise rolling said welded assembly to flatten the weld between said flattened parts and further flatten said flattened parts to the thickness of said article.

ROBERT T. GILLETTE.